United States Patent
Eser et al.

(10) Patent No.: US 12,179,573 B2
(45) Date of Patent: Dec. 31, 2024

(54) THERMAL MANAGEMENT SYSTEM AND VEHICLE

(71) Applicant: Vitesco Technologies GmbH, Regensburg (DE)

(72) Inventors: Gerhard Eser, Munich (DE); Sebastian Brettner, Munich (DE); Manuel Dillinger, Munich (DE); Markus Feulner, Munich (DE); Hong Zhang, Munich (DE)

(73) Assignee: Vitesco Technologies GmbH, Regensburg (DE)

( * ) Notice: Subject to any disclaimer, the term of this patent is extended or adjusted under 35 U.S.C. 154(b) by 294 days.

(21) Appl. No.: 17/642,061

(22) PCT Filed: Sep. 4, 2020

(86) PCT No.: PCT/EP2020/074848
§ 371 (c)(1),
(2) Date: Mar. 10, 2022

(87) PCT Pub. No.: WO2021/052788
PCT Pub. Date: Mar. 25, 2021

(65) Prior Publication Data
US 2022/0402349 A1    Dec. 22, 2022

(30) Foreign Application Priority Data
Sep. 16, 2019    (DE) .................... 10 2019 214 082.3

(51) Int. Cl.
*B60K 11/02*    (2006.01)
*B60K 1/00*    (2006.01)
*B60L 58/26*    (2019.01)

(52) U.S. Cl.
CPC .............. *B60K 11/02* (2013.01); *B60L 58/26* (2019.02); *B60K 2001/005* (2013.01); *B60K 2001/006* (2013.01)

(58) Field of Classification Search
CPC ... F01P 3/20; B60K 6/26; B60L 58/26; H06K 9/19; B60H 1/00885; B60H 2001/00928; B60H 2001/00935
See application file for complete search history.

(56) References Cited

U.S. PATENT DOCUMENTS 6,323,613 B1 * 11/2001 Hara .................... H02K 16/00
903/952
6,405,688 B1    6/2002 Dahm et al.
(Continued)

FOREIGN PATENT DOCUMENTS

CN    106080225    11/2016
DE    10155387    5/2003
(Continued)

OTHER PUBLICATIONS

Office Action of corresponding German Patent Application No. 10 2019 214 082.3.
(Continued)

*Primary Examiner* — Elizabeth J Martin
(74) *Attorney, Agent, or Firm* — Cozen O'Connor

(57) ABSTRACT

A thermal management system for a vehicle and a vehicle having a thermal management system, the thermal management system having a first coolant circuit for a battery and a second coolant circuit for an electric motor for driving the vehicle. The two coolant circuits can be operated in series or in parallel by a multi-way valve. The thermal management system further includes an oil cooling circuit for additionally (Continued)

cooling the electric motor, wherein the oil cooling circuit is thermally connected to the second coolant circuit via a heat exchanger.

9 Claims, 6 Drawing Sheets

(56) References Cited

U.S. PATENT DOCUMENTS

| | | | |
|---|---|---|---|
| 2010/0295391 A1* | 11/2010 | Perkins | B60K 6/48 |
| | | | 903/906 |
| 2011/0296855 A1* | 12/2011 | Johnston | B60L 50/40 |
| | | | 62/160 |
| 2012/0043836 A1 | 2/2012 | Creviston | |
| 2015/0032318 A1* | 1/2015 | Gao | B60H 1/00392 |
| | | | 903/903 |
| 2015/0329106 A1* | 11/2015 | Kuwahara | B60W 10/02 |
| | | | 180/65.265 |
| 2019/0070924 A1 | 3/2019 | Mancini et al. | |
| 2019/0260272 A1 | 8/2019 | Honjo | |

FOREIGN PATENT DOCUMENTS

| | | |
|---|---|---|
| DE | 102012108043 | 5/2014 |
| DE | 102015122196 | 6/2017 |
| DE | 102017107384 | 10/2018 |
| EP | 2392486 | 4/2018 |
| JP | 2017114298 | 6/2017 |
| JP | 2019116128 | 7/2019 |
| WO | WO 2017214234 | 12/2017 |
| WO | WO 2018064054 | 4/2018 |

OTHER PUBLICATIONS

Office Action dated Oct. 18, 2023, issued in Chinese Patent Application No. 202080056834.8.

Office Action dated May 12, 2024 issued in Chinese Patent Application No. 202080056834.8.

* cited by examiner

THERMAL MANAGEMENT SYSTEM AND VEHICLE

CROSS REFERENCE TO RELATED APPLICATIONS

This is a U.S. national stage of Application No. PCT/EP2020/074848 filed Sep. 4, 2020. Priority is claimed on German Application No. DE 10 2019 214 082.3 filed Sep. 16, 2019 the content of which is incorporated herein by reference.

BACKGROUND OF THE INVENTION

1. Field of the Invention

The disclosure relates to a thermal management system for a vehicle. The disclosure also relates to a vehicle having such a thermal management system.

A vehicle is to be understood here as any type of vehicle comprising a battery and an electric motor, the temperature of both of which is to be controlled, for driving the vehicle. The battery may in this case be air-cooled and/or coolant-cooled or water-cooled. The electric motor, on the other hand, is in this case coolant-cooled or water-cooled. This may be a partially electric or fully electric vehicle, but in particular passenger cars and/or utility vehicles.

2. Description of the Related Art

EP 2392486 B1 discloses a thermal management system having a first coolant circuit for controlling the temperature of a battery and a second coolant circuit for controlling the temperature of an electric motor and a power electronics system.

SUMMARY OF THE INVENTION

It is an object of one aspect of the invention to improve such a thermal management system.

A thermal management system for a vehicle is proposed, wherein the thermal management system comprises a first coolant circuit for a battery and a second coolant circuit for an electric motor for driving the vehicle.

The two coolant circuits can be operated here in series with one another by a multi-way valve in a first mode of the system and in a first valve position of the multi-way valve or in parallel with one another in a second mode of the system and in a second valve position of the multi-way valve.

In one aspect of the invention, the two coolant circuits can also alternatively be operable here in a third mode of the system and in a third valve position of the multi-way valve, in which the multi-way valve takes up an intermediate position in which the coolant flows of the two coolant circuits are mixed with each other as needed.

With such a needs-based mixing, waste heat or heat loss from the electric motor coolant circuit can advantageously be dissipated to the battery coolant circuit without a sudden transition behavior of the system being experienced, the transition behavior arising as such when switching between the series connection mode and the parallel connection mode and being expressed in the form of sudden changes in temperature and pressure. In addition, frequent switching between the series connection mode and the parallel connection mode can be avoided during transient journeys in which the electric motor heats up quickly. Such a needs-based mixing accordingly improves the temperature control of both the electric motor coolant circuit and the battery coolant circuit.

The thermal management system also comprises an oil cooling circuit for additionally cooling the electric motor, wherein the oil cooling circuit is thermally connected to the second coolant circuit via a heat exchanger, for example in the form of a plate heat exchanger.

Here, an oil cools the electric motor in addition to the coolant of the electric motor coolant circuit by absorbing the waste heat from the stator and rotor of the electric motor and supplying it to the electric motor coolant circuit via the heat exchanger. The oil in this case also lubricates the bearing points of a rotor shaft.

Such a coolant is to be understood in this case as a mixture of water with a coolant additive. The task of the coolant here is not only to absorb and transport waste heat. The cooling additive is intended here to protect the water from freezing through, to protect the two coolant circuits from corrosion, to lubricate the moving parts in the two coolant circuits and also to protect plastic and/or rubber elements in the two coolant circuits from dissolving.

In a further embodiment, the heat exchanger is arranged fluidically in parallel with the coolant-cooled stator of the electric motor. A first feed line from a junction of the second coolant circuit upstream of the stator may lead to the heat exchanger and a second feed line may lead from the heat exchanger to a junction of the second coolant circuit downstream of the stator.

In a further aspect of the invention, the oil cooling circuit has a monitoring system having at least one pressure sensor for monitoring an oil flow generated by an oil pump.

In this case, the monitoring system may also have a speed sensor, which is arranged on the oil pump and using which a delivered volume flow and mass flow can be determined.

In a further aspect of the invention, the monitoring system has an additional pressure sensor. In this case, a speed sensor may also be provided.

In this case, the at least one pressure sensor or the two pressure sensors may be arranged upstream of the heat exchanger and downstream of the oil pump.

Owing to this proposed sensor redundancy, the recorded pressures or measured pressure values can be checked for plausibility.

BRIEF DESCRIPTION OF THE DRAWINGS

The invention will be explained below in detail with reference to illustrations in figures. Further advantageous refinements of the invention emerge from the dependent claims and from the description below of preferred embodiments. In the figures:

DETAILED DESCRIPTION OF THE PRESENTLY PREFERRED EMBODIMENTS

Figure 1:
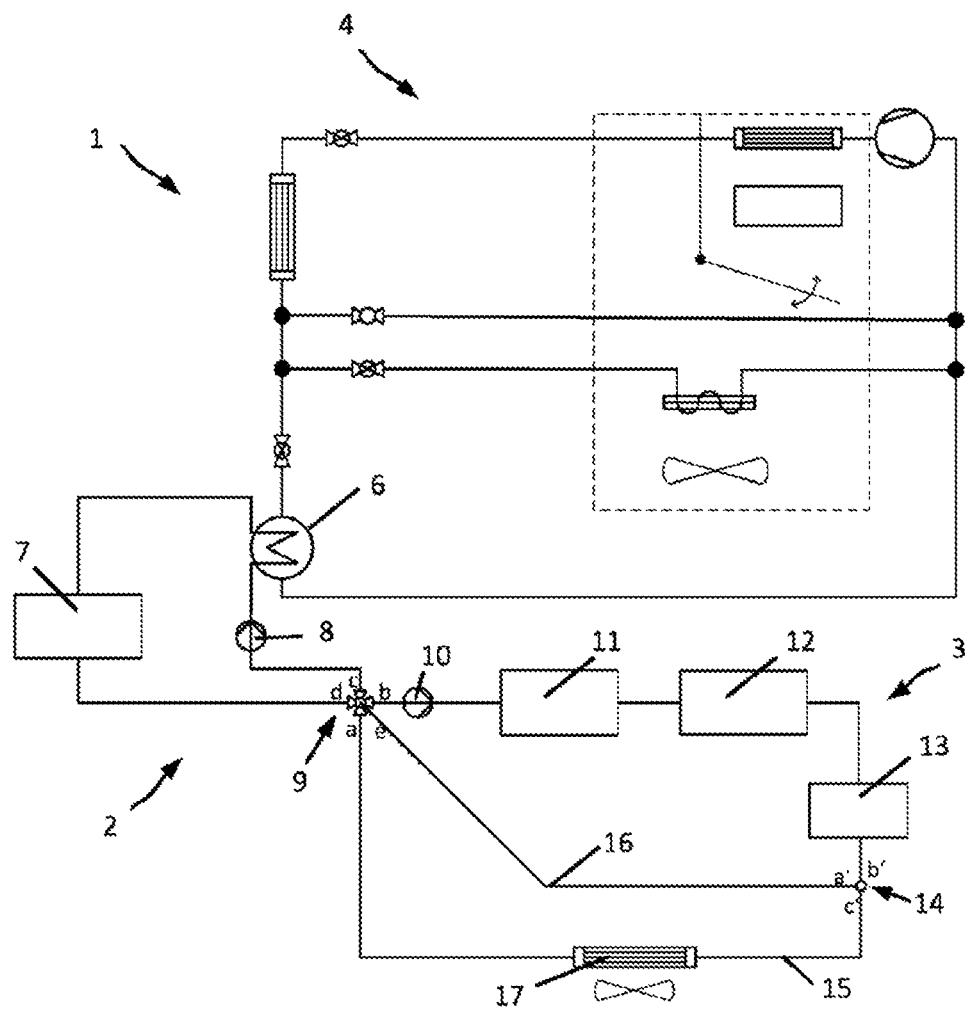
FIG. 1 is a thermal management system.

The thermal management system 1 of a vehicle according to FIG. 1 illustrates a first coolant circuit 2 for a battery 7 and a second coolant circuit 3 for an electric motor 13 for driving the vehicle, as well as a refrigerant circuit 4 of an air conditioning system, which is not dealt with in any more detail below, however. The vehicle may in this case be, for example, a battery electric vehicle (for short: BEV), a hybrid electric vehicle (for short: HEV), or a fuel cell electric vehicle (for short: FCEV). These three cooling circuits 2, 3, 4 merge to a certain extent with one another. The respective coolant is conveyed in the two coolant circuits 2, 3 by a dedicated electric pump 8, 10.

Such a coolant is to be understood in this case as a mixture of water with a coolant additive. The task of the coolant here is not only to absorb and transport waste heat. The cooling additive is intended here to protect the water from freezing through, to protect the two coolant circuits from corrosion, to lubricate the moving parts in the two coolant circuits, and also to protect plastic and/or rubber elements in the two coolant circuits from dissolving.

The electric motor 13 and a power electronics system 12 should be operated at a coolant or cooling water temperature of approximately 80 to a maximum of 85° C. In this case, the coolant has a temperature of approximately 55° C. at the inlet to the power electronics system 12 and a temperature of approximately 65° C. at the inlet to the electric motor 13. At the outlet of the electric motor 13, the cooling liquid then has a temperature of approximately 80 to a maximum of 85° C.

The battery 7 or the battery cells, in contrast, should be operated in a coolant or cooling water temperature window between approximately 20° C. and approximately 40° C. because this ensures an optimal operating temperature range for the battery 7. The temperature of the battery 7 or of the individual battery cells themselves can in this case definitely exceed the temperature threshold of approximately 40° C. The two coolant circuits 2, 3 have to be able to both absorb and dissipate heat. While the battery coolant circuit 2 is cooled with respect to the refrigerant circuit 4 via a heat exchanger 6 (also called a chiller; cf. FIG. 1), the electric motor coolant circuit 3 can be cooled with respect to the environment via a radiator or cooler 17 as well as with respect to the battery coolant circuit 2 via a multi-way valve 9 (also referred to as coolant flow control valve, for short: CFCV), which is described below, wherein the multi-way valve 9 constitutes an interface between the battery coolant circuit 2 and the electric motor coolant circuit 3 and which assumes a corresponding valve position so that the coolant flows of the two coolant circuits 2, 3 can mix with one another as required.

The battery coolant circuit 2 can also be cooled via the radiator or cooler 17 in an appropriate valve position of the multi-way valve 9. However, since the battery coolant should not exceed a temperature of 40° C., the cooling via the radiator 17 is usually insufficient, and therefore heat has to be dissipated via the heat exchanger 6. In addition to the electric motor 13 and the power electronics system 12, a charging device 11 (also referred to as charger) is also to be cooled in the electric motor coolant circuit 3. To control the coolant circuits 2, 3, a respective temperature sensor (not illustrated) is provided. A resistance heater (not illustrated) is also provided in the battery coolant circuit 2 in order to be able to supply electrical heat for a short time.

The thermal management system 1 can be operated in different modes by the multi-way valve 9. The multi-way valve 9 here is part of what is referred to as an actuator unit, also referred to as cooling water valve unit or cooling water control valve unit, which as such also comprises a drive unit with an electric servomotor and a control unit for controlling the electric servomotor.

With regard to these modes, for the sake of completeness, reference is made to the German patent application with the file number 10 2019 210 577.7, which goes into this in detail.

In a first mode of the system (Use Case 1, for short: UC1=series connection R with maximum heat recovery) and in a first valve position of the multi-way valve 9, the coolant circuit 2 can be connected in series with the coolant circuit 3. In this case, with respect to the multi-way valve 9, coolant flows via an inflow or inlet a and an outflow or outlet c from the coolant circuit 3 into the coolant circuit 2 and finally via an inflow or inlet d and an outflow or outlet b from the coolant circuit 2 back into the coolant circuit 3.

This series connection causes the battery coolant circuit 2 to heat rapidly, utilizing the waste heat from the electric motor 13 and the power electronics system 12. The electric motor coolant circuit 3 thus also has the function of a heating circuit.

In a second mode of the system (Use Case 2, for short: UC2=parallel connection P with overheating protection) and in a second valve position of the multi-way valve 9, the coolant circuit 2 can be connected parallel to the coolant circuit 3, such that the two coolant circuits 2, 3 are fluidically separated from each other. This separation protects the battery 7 from overheating.

In addition, a third mode of the system (Use Case 3, for short: UC3=mixing mode M with selective heat recovery) is also proposed, in which the multi-way valve 9 is switched to an intermediate position—that is to say a third valve position—in which the coolant flows of the two coolant circuits 2, 3 are mixed with each other as needed.

Such a mixing mode allows both the coolant temperature of the battery coolant circuit 2 and the coolant temperature of the electric motor coolant circuit 13 to be controlled more precisely. In this case, there are advantageously no high pressure and temperature jumps in the two coolant circuits 2, 3, since there is no frequent switching between the series connection mode R and the parallel connection mode P.

In the embodiment proposed here (cf. for example FIG. 1), the multi-way valve 9 is designed in the form of a ⅗-way valve. An inlet or input e of the ⅗-way valve that protrudes from the plane in FIG. 1 should also be imagined here, which inlet or input as such is fluidically connected via a bypass path 16 to a junction 14 (or the outlet aI thereof) downstream of the electric motor 13, wherein both the bypass path 16 and a path 15 parallel thereto with a radiator 17 originate from the junction 14. The radiator path 15 fluidically connects the junction 14 (or the outlet cI thereof) to the inlet or input a of the ⅗-way valve.

Instead of said ⅗-way valve, it is also possible to use a multi-way valve in the form of a ⅘-way valve, via which the previously described system modes and valve positions can likewise be set or controlled. A further multi-way valve in the form of a ⅗-way valve, which is fluidically connected to the inflow or input a of the ⅘-way valve, is to be provided here in the coolant circuit 3 downstream of the electric motor 13—instead of the aforementioned junction.

With regard to this alternative configuration, for the sake of completeness, reference is likewise made to the German patent application with the file number 10 2019 210 577.7, which goes into this in detail.

Figure 2:
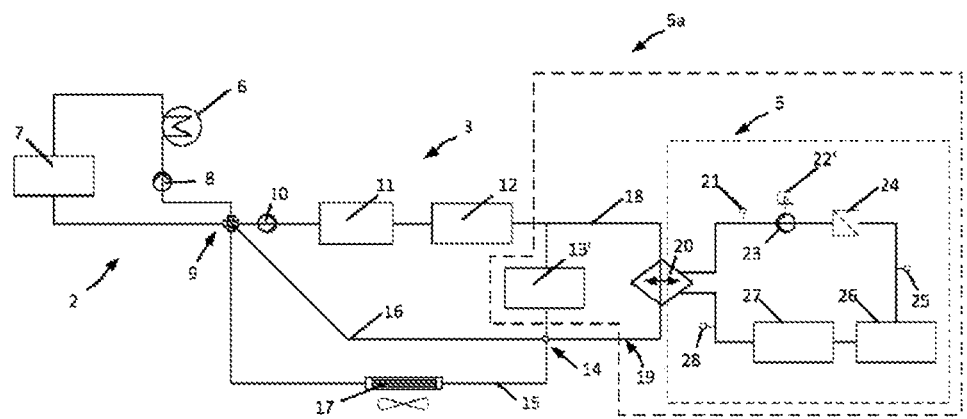
FIG. 2 is the thermal management system shown in FIG. 1 in connection with an oil cooling circuit.

The thermal management system 1 further comprises an oil cooling system 5a having an oil cooling circuit 5 (cf. FIG. 2, FIG. 3, FIG. 4) for additional cooling of the electric motor 13. The oil cooling circuit 5 is thermally connected here to the coolant circuit 3 by a heat exchanger 20. In addition to a part of the heat exchanger 20, the oil cooling circuit 5 comprises the rotor 27 of the electric motor 13 and a gear or reduction and/or transmission gear 26, for example in the form of a three-stage gear, which together with the electric motor 13 (or stator 13I and rotor 27) forms an electric motor-gear drive unit. The oil cooling circuit 5 further comprises an oil pump 23, an oil filter 24 fluidically connected upstream of the oil pump 23 and two temperature sensors 25, 28 (cf. FIG. 2, FIG. 3, FIG. 4).

In contrast, the stator $13^I$ of the electric motor 13 is encompassed by the coolant circuit 3, that is to say that the stator $13^I$ is coolant-cooled or water-cooled.

The waste heat from the electric motor 13 or stator $13^I$ and rotor 27 absorbed by the oil cooling circuit 5 is fed to the coolant circuit 3 via the heat exchanger 20. In this case, the heat exchanger 20 is arranged fluidically in parallel with the coolant-cooled or water-cooled stator $13^I$.

A first feed line 18 in this case leads from a junction of the coolant circuit 3 upstream of the stator 13I to the heat exchanger 20 and a second feed line 19 leads from the heat exchanger 20 to said junction 14 downstream of the stator $13^I$.

An oil, which is also used for lubricating and cooling the transmission 26, is conveyed through a shaft of the rotor 27 to at least one outlet point of the rotor 27. From this outlet point, the oil is forced against the windings of the stator 13I as a result of centrifugal force, with the oil being distributed over the rotor 27 and in this case also reaching the two bearing points of the rotor shaft. The oil finally flows into an oil pan fixed to the stator 13I and by which it is held. The oil pump 23 sucks in the oil from the oil pan and conveys it.

Here, the oil cools the electric motor 13 in addition to the coolant of the electric motor coolant circuit by absorbing the waste heat from the stator 13I and rotor 27 and at the same time lubricating said bearing points of the rotor shaft.

Figure 3:
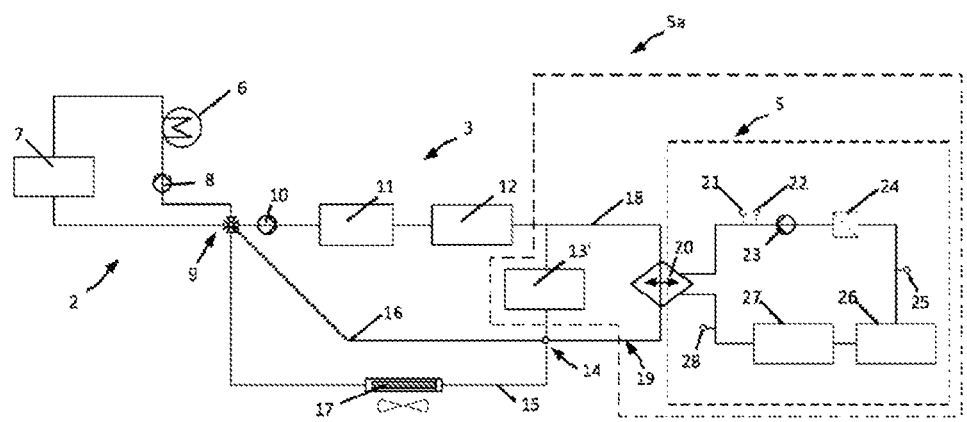
FIG. 3 is the thermal management system shown in FIG. 1 in connection with an oil cooling circuit.
Figure 4:
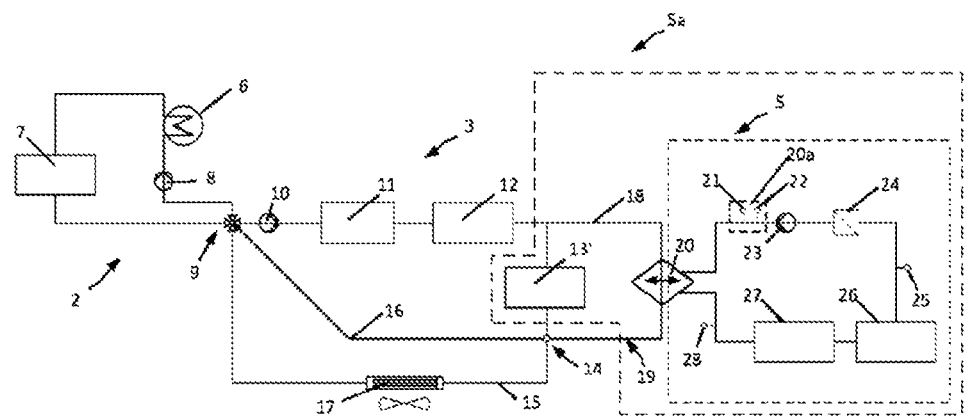
FIG. 4 is the thermal management system shown in FIG. 1 in connection with an oil cooling circuit.

The oil cooling circuit 5 also comprises a monitoring system for monitoring the oil flow. The monitoring system preferably comprises in this case a pressure sensor 21 upstream of the heat exchanger 20 and downstream of the oil pump 23. In a first embodiment, the monitoring system further comprises a speed sensor 22I, which is arranged on the oil pump 23 for detecting a pump speed (cf. FIG. 2). In a second embodiment, instead of the speed sensor 22I, an additional pressure sensor 22 is advantageously proposed in order to be able to determine pressure differences by detected pressures. By using the two pressure sensors 21, 22, the costs of such a monitoring system can be reduced significantly. It is proposed here to arrange the two pressure sensors 21, 22 preferably upstream of the heat exchanger 20 and downstream of the oil pump 23. In FIG. 3, in contrast to FIG. 2, the two pressure sensors 21, 22 are an integral part of a sensor module 20a.

Figure 5:
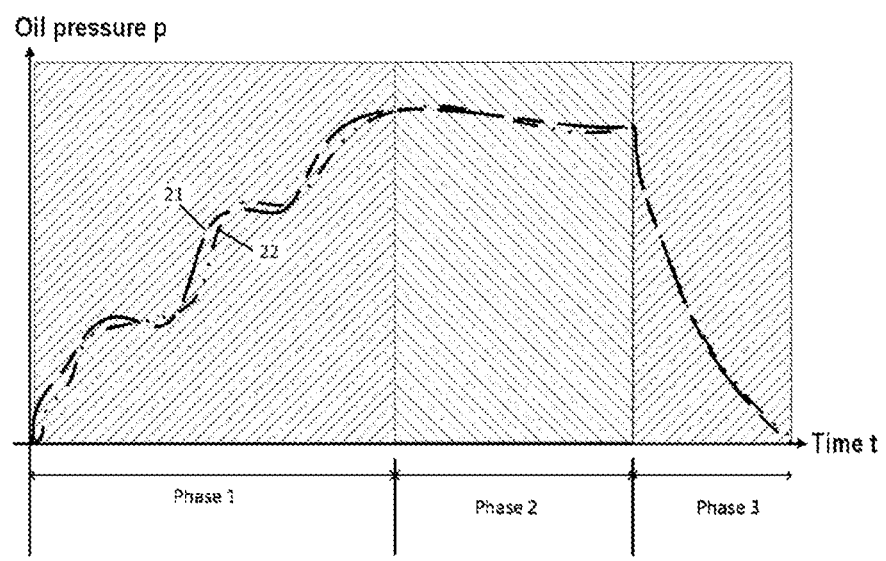
FIG. 5 is oil pressure curves corresponding to different phases of the oil cooling circuit.

FIG. 5 illustrates the pressure curves, which are detected by the two pressure sensors 21, 22, corresponding to the oil flow in the oil cooling circuit 5 in three successive phases, namely:

in a pressure build-up phase (phase I),
in an operating phase (phase II), which follows the pressure build-up phase, and
in a pressure reduction phase (phase III), which follows the operating phase.

In order to monitor the oil flow, pressure difference values are determined here between the two pressure curves with regard to the individual phases I to III. These pressure difference values are then compared with a predeterminable and phase-related comparison value—also referred to as a threshold value or reference value—for the pressure difference in order to check for an error, with an error being identified if the comparison value is exceeded.

Figure 6:
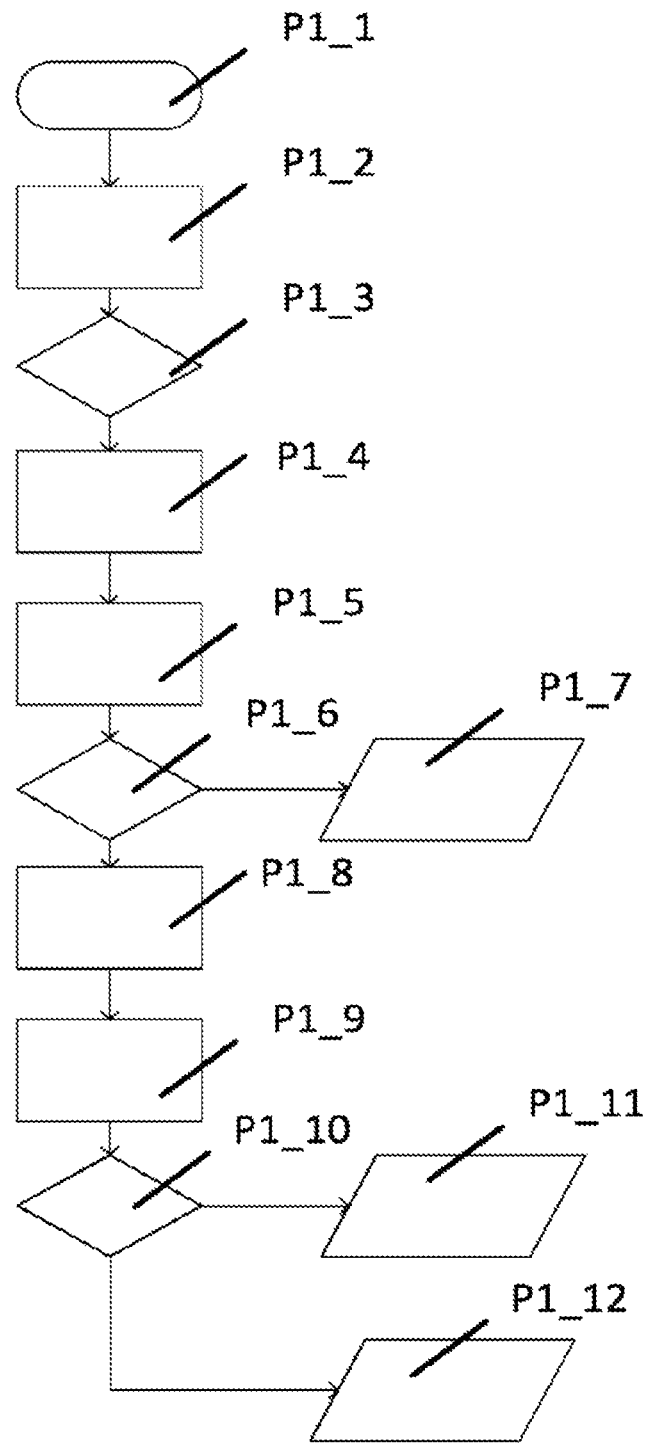
FIG. 6 is a flowchart corresponding to a proposed monitoring of the oil cooling circuit in a pressure build-up phase.

Even before the oil pump 23 and thus the oil cooling circuit 5 is put into operation or activated, that is to say before the pressure build-up phase (phase I) is initiated, it is proposed to check for an electrical fault in the monitoring system (or sensor fault), that is to say, for example, a short circuit or cable break (cf. in this respect steps P1_1 to P1_7 in FIG. 6).

For this purpose, a minimum time or debounce time is allowed to elapse (cf. step P1_2, FIG. 6) from the time this check is initiated (cf. step P1_1, FIG. 6) in order to ensure that the oil cooling circuit 5 is idle and the pressure within the oil cooling circuit 5 is reduced. This condition is checked in step P1_3. The signals from the pressure sensors 21, 22 are then discretely recorded at least one point in time and a pressure difference value is determined for this point in time (cf. step P1_4, FIG. 6). This pressure difference value is then compared in step P1_5 with a predeterminable, first pressure comparison value SW1. If the pressure difference value exceeds the pressure threshold value SW1 in step P1_6, an electrical fault of this type in the monitoring system (or sensor fault) is identified (cf. step P1_7, FIG. 6). Otherwise, there is a fault-free monitoring system.

In step P1_8, the oil pump 23 and thus the oil cooling circuit 5 are put into operation or activated, as a result of which the pressure build-up phase (phase I) is initiated. The signals of the pressure sensors 21, 22 for at least one pressure stroke of the oil pump 23—which is a positive displacement pump—are recorded here discretely (cf. step P1_8, FIG. 6). Such a pressure stroke during the pressure build-up phase (phase I) can be clearly seen in FIG. 5. Then at least one pressure difference value is determined (cf. step P1_8, FIG. 6) and the pressure difference value is then compared with a predeterminable, second pressure comparison value SW2 (phase-related comparison value for the pressure difference) (cf. step P1_9, FIG. 6). In addition to this, the time until the pressure stroke is reached can also be compared with a predeterminable time comparison value.

In the event that the determined pressure difference value on the one hand and possibly also the determined time value on the other hand exceed the respectively assigned comparison value (cf. step P1_10, FIG. 6), such a fault is identified (cf. fault output in step P1_11, FIG. 6) in the pressure build-up phase (phase I). Otherwise, there is a fault-free pressure build-up phase (phase I) (cf. step P1_12, FIG. 6).

Figure 7:
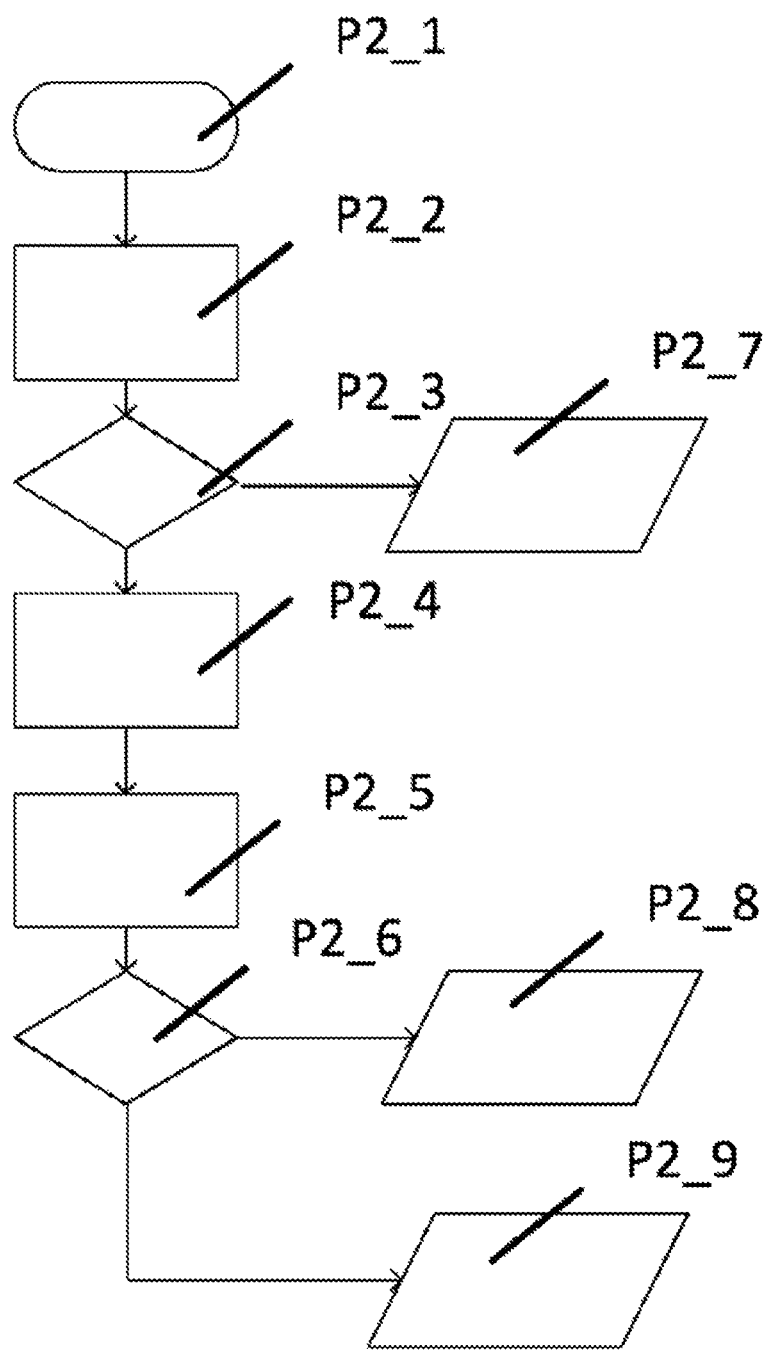
FIG. 7 is a flowchart corresponding to a proposed monitoring of the oil cooling circuit in an operating phase.

After initiation of the operating phase (phase II; cf. step P2_1, FIG. 7), which follows the pressure build-up phase (phase I), the signals of the pressure sensors 21, 22 are again detected discretely, that is to say at at least one point in time and for this point in time a pressure difference value is determined from the two sensor signals (cf. step P2_2, FIG. 7). This pressure difference value is then compared with a predeterminable third pressure comparison value SW3 (phase-related comparison value for the pressure difference) (cf. also step P2_2, FIG. 7) in order to check for an electrical fault in the monitoring system (or sensor fault). If the determined pressure difference value exceeds the pressure comparison value SW3 (cf. step P2_3, FIG. 7), an electrical fault of this type in the monitoring system (or sensor fault) is identified (cf. step P2_7, FIG. 7).

Subsequently, a mean value is formed from the discretely recorded signals of the two pressure sensors 21, 22 (cf. step P2_4, FIG. 7) and this mean value or pressure mean value is then compared (cf. step P2_5, FIG. 7) with a predeterminable fourth pressure comparison value (phase-related comparison value for the pressure difference) in order to check for a fault in the operating phase (phase II). If this mean pressure value exceeds the comparison value in step P2_6, then such a fault is identified (cf. step P2_8, FIG. 7) in the operating phase (phase II). Otherwise, there is a fault-free operating phase (phase II) (cf. step P2_9, FIG. 7).

Figure 8:
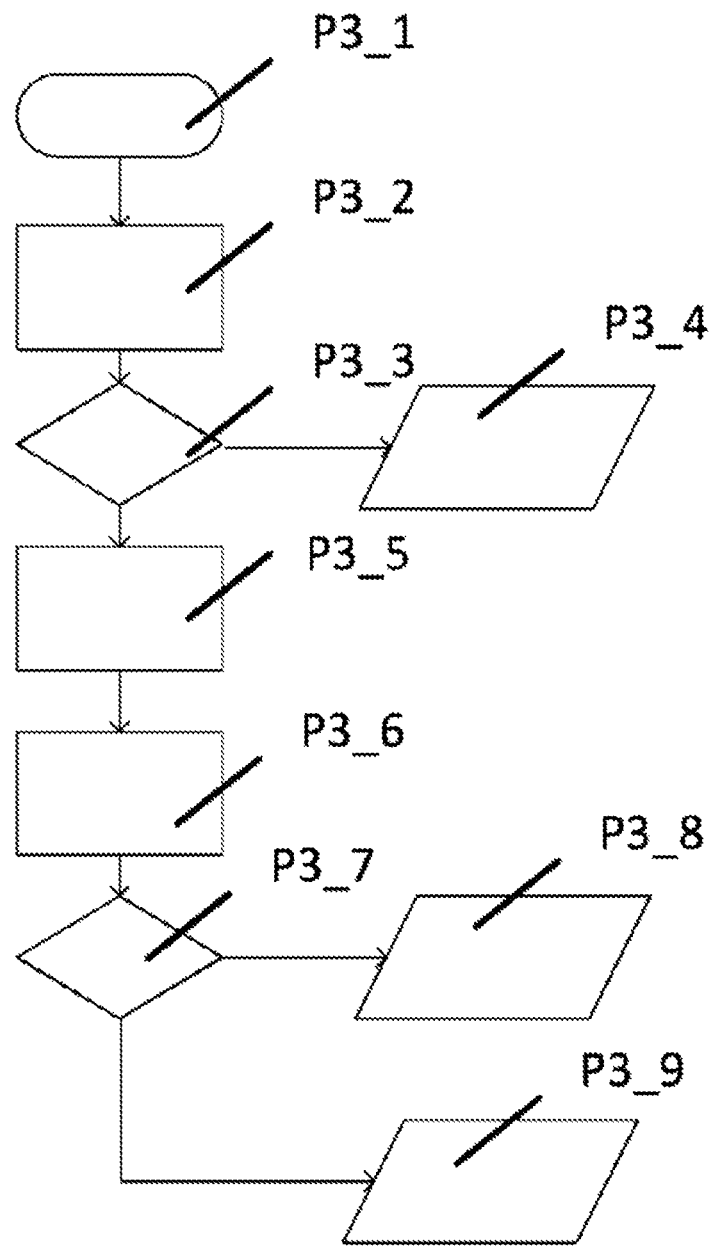
FIG. 8 is a flowchart corresponding to a proposed monitoring of the oil cooling circuit in a pressure reduction phase.

After the oil pump 23 used to initiate the pressure reduction phase (phase III) has been deactivated or taken out of operation (cf. step P3_1, FIG. 8), the signals from the pressure sensors 21, 22 are again discretely recorded at at least one point in time (cf. step P3_2, FIG. 8). A pressure difference value is then determined for this point in time and this pressure difference value is then compared (cf. also step P3_2, FIG. 8) with a predeterminable fifth pressure comparison value SW5 (phase-related comparison value for the pressure difference) in order to check for an electrical fault in the monitoring system (or sensor fault). If this pressure difference value exceeds the pressure comparison value in step P3_3, an electrical fault of this type in the monitoring system (or sensor fault) is identified (cf. step P3_4, FIG. 8). Otherwise, there is a fault-free monitoring system.

A pressure reduction is then monitored by comparing, after a predeterminable time or debounce time (cf. step P3_5, FIG. 8) with respect to the initiation of the pressure reduction phase (phase III), the two discretely recorded pressures or pressure sensor values with a predeterminable target value related to the debounce time (sixth pressure comparison value SW6; phase-related comparison value for the pressure difference) in order to check for a fault in the pressure reduction phase (phase III). If this target value is exceeded (cf. step P3_7, FIG. 8), such a fault is identified (cf. step P3_8, FIG. 8) in the pressure reduction phase (phase III). Otherwise, there is a fault-free pressure reduction phase (phase III) (cf. step P3_9, FIG. 8).

With regard to the individual phases I, II, III, it is proposed that the pressure sensor values be recorded every 10 to 100 ms, for example. The previously mentioned phase-related comparison values can vary here in a phase-related manner, that is to say can be phase-specific.

Although exemplary embodiments are explained in the above description, it should be noted that numerous modifications are possible. It should moreover be pointed out that the exemplary embodiments are merely examples which are not intended to limit the scope of protection, the applications and the structure in any way. Instead, the above description gives a person skilled in the art a guideline for the implementation of at least one exemplary embodiment, wherein various changes may be made, especially with regard to the function and arrangement of the integral parts described, without departing from the scope of protection as it is apparent from the claims and combinations of features equivalent thereto.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A thermal management system for a vehicle, comprising:
    a first coolant circuit for a battery;
    a second coolant circuit for an electric motor configured to drive the vehicle;
    a multi-way valve configured to operate the first and second coolant circuits:
        in a first mode and in a first valve position of the multi-way valve, the first and second coolant circuits in series with one another or
        in a second mode and in a second valve position of the multi-way valve, the first and second coolant circuits in parallel with one another or
        in a third mode and in a third valve position of the multi-way valve, in which the multi-way valve assumes an intermediate position in which coolant flows of the first and second coolant circuits are mixed with each other as needed;
    an oil cooling circuit for additionally cooling the electric motor; and
    a heat exchanger that thermally connects the oil cooling circuit to the second coolant circuit.

2. The thermal management system as claimed in claim 1, wherein the heat exchanger is arranged fluidically in parallel with a coolant-cooled stator of the electric motor.

3. The thermal management system as claimed in claim 2, wherein a first feed line leads from a first junction of the second coolant circuit upstream of the coolant-cooled stator to the heat exchanger and a second feed line leads from the heat exchanger to a second junction of the second coolant circuit downstream of the coolant-cooled stator.

4. The thermal management system as claimed in claim 1, wherein the oil cooling circuit has a monitoring system having at least one pressure sensor for monitoring an oil flow generated by an oil pump.

5. The thermal management system as claimed in claim 4, wherein the monitoring system has a speed sensor, which is arranged on the oil pump.

6. The thermal management system as claimed in claim 4, wherein the monitoring system has an additional pressure sensor.

7. The thermal management system as claimed in claim 4, wherein the at least one pressure sensor, is arranged upstream of the heat exchanger and downstream of the oil pump.

8. The thermal management system as claimed in claim 6, each pressure sensors, is arranged upstream of the heat exchanger and downstream of the oil pump.

9. A vehicle having a thermal management system comprising:
    a first coolant circuit for a battery;
    a second coolant circuit for an electric motor configured to drive the vehicle;

a multi-way valve configured to operate the first and second coolant circuits:
- in a first mode and in a first valve position of the multi-way valve, the first and second coolant circuits in series with one another or
- in a second mode and in a second valve position of the multi-way valve, the first and second coolant circuits in parallel with one another or
- in a third mode and in a third valve position of the multi-way valve, in which the multi-way valve assumes an intermediate position in which coolant flows of the first and second coolant circuits are mixed with each other as needed;

an oil cooling circuit for additionally cooling the electric motor; and a heat exchanger that thermally connects the oil cooling circuit to the second coolant circuit.

* * * * *